United States Patent [19]

Andrich et al.

[11] Patent Number: 4,716,300

[45] Date of Patent: Dec. 29, 1987

[54] APPARATUS FOR SCANNING DOCUMENTS IN A RASTER LINE MODE USING MARGIN STOPS

[75] Inventors: Wolfgang Andrich; Helmut W. Schilling, both of Pforzheim, Fed. Rep. of Germany

[73] Assignee: Alcatel NV, Amsterdam

[21] Appl. No.: 881,763

[22] Filed: Jul. 3, 1986

[30] Foreign Application Priority Data

Jul. 17, 1985 [DE] Fed. Rep. of Germany ....... 3525450

[51] Int. Cl.$^4$ ............................................... H04N 1/10
[52] U.S. Cl. .................................... 250/578; 358/293
[58] Field of Search ............... 250/234, 578; 358/293, 358/294, 209, 212, 213

[56] References Cited

U.S. PATENT DOCUMENTS

| 4,050,780 | 9/1977 | Wei et al. | 250/234 |
| 4,348,593 | 9/1982 | Seachman | 358/293 |
| 4,518,999 | 5/1985 | Kurata et al. | 358/293 |
| 4,652,937 | 3/1987 | Shimura et al. | 358/294 |

*Primary Examiner*—David C. Nelms
*Assistant Examiner*—Stephone B. Allen
*Attorney, Agent, or Firm*—Christie, Parker & Hale

[57] ABSTRACT

The apparatus consists of a hand device (3) and a control device (1) which are interconnected by a flexible cable (2). The hand device, which has a mechanism (17) with shafts (18) and a line-long optical scanner (13), is moved by hand across the document (21) to scan the document in a raster line mode. The display of the scanned document area by the display device (9) and the transfer into a memory of the control device (1) are selectable via key switches (6, 7) fitted in handles (5).

2 Claims, 2 Drawing Figures

4,716,300

APPARATUS FOR SCANNING DOCUMENTS IN A RASTER LINE MODE USING MARGIN STOPS

TECHNICAL FIELD

The present invention relates to an optical scanner for scanning flat documents in a raster line mode.

BACKGROUND OF THE INVENTION

A typical prior art optical scanner is disclosed in German patent publication DE-OS 32 33 232. It consists essentially of a console-like housing having an elastic support surface for the document to be scanned, a transparent plate holding down the document, and an optical scanning head which can be moved across the plate. The scanning head is guided via parallel lateral supports on rails in the housing and is moved in the scan direction via a motorized rope mechanism rope.

Such a prior art apparatus must be installed at a fixed location. The size of the documents is limited by the size of the attached support surface. Thus, it is not readily possible to scan and display parts of large-size documents. The entire surface of a document is scanned in a single scanning operation.

BRIEF SUMMARY OF THE PRESENT INVENTION

It is an overall object of the invention to provide a scanning device which is not limited to a particular document size.

The principal advantages offered by the various specific aspects of the invention include (1) the design of the scanner as a hand device with a mechanism permits scanning of any flat document of any size, (2) due to a flexible cable connection to the control device, the scanner is freely movable and easy to handle, (3) the line area being scanned can be seen on the display device so that it is possible to simply align the hand device with the record or, in case of large-size documents, with each part desired, in accordance with the width of the optical scanner, (4) the storage width as compared to the width of the optical scanner can be changed by margin stops, with the position of the margin stops being shown on the display device by vertical lines which indicate the storage width, and (5) in connection with a suitable memory organization, it is thus possible to scan and combine document parts of different widths.

BRIEF DESCRIPTION OF THE DRAWINGS

An embodiment of the invention will now be described with reference to the appended Drawings, in which.

DETAILED DISCLOSURE OF A PREFERRED EMBODIMENT

Figure 1:
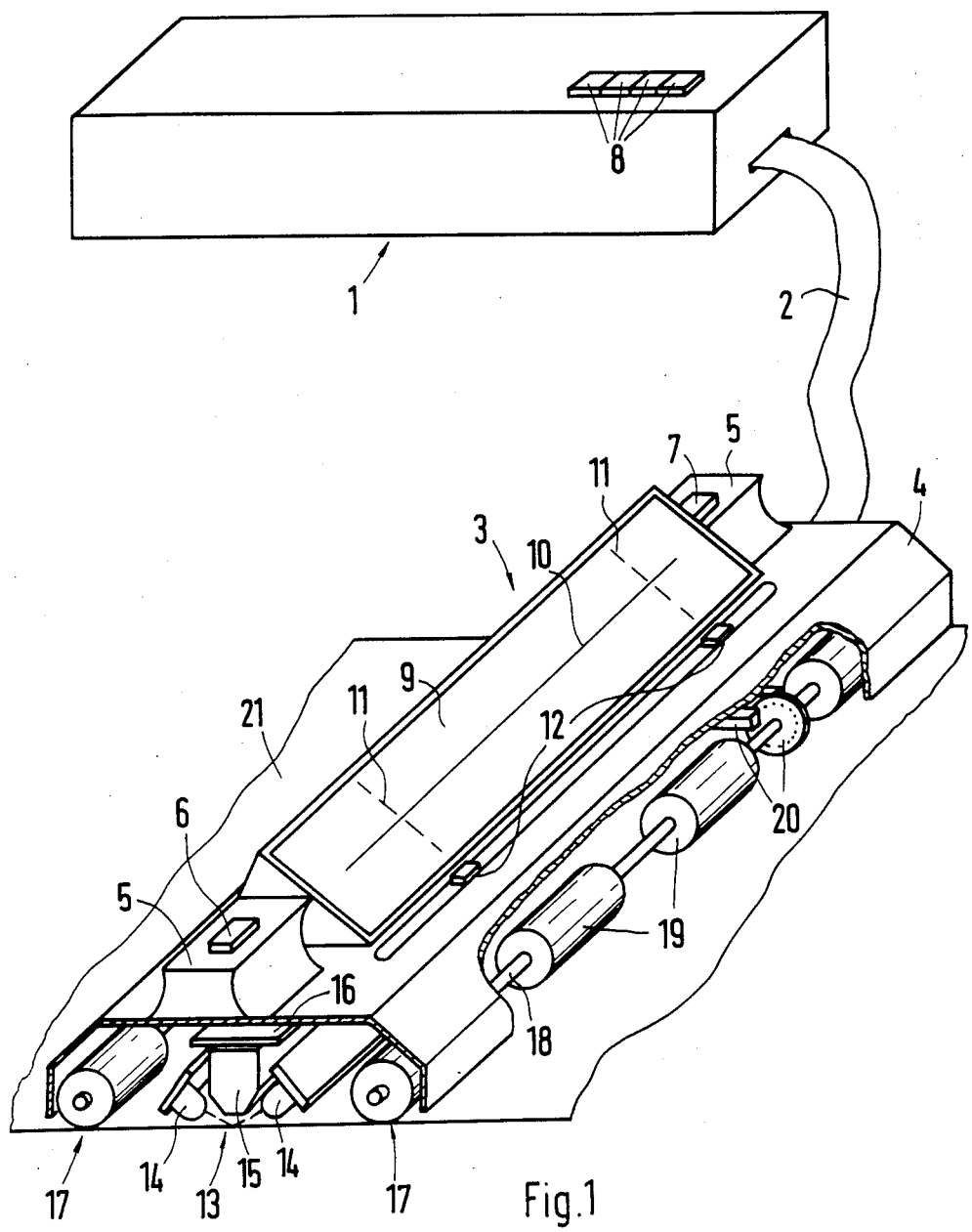
FIG. 1 is a perspective view of a scanning device in accordance with the invention, consisting of a hand device and a control device.

FIG. 1 is a perspective view of an apparatus for scanning flat documents in a raster line mode. The apparatus consists of a control device 1 and a hand device 3, connected to the former by a flexible cable 2. The cable is long enoiugh to allow the hand device enough freedom of movement to be moved freely over documents 21 of different sizes to be scanned. The control device 1 essentially contains a power supply and control and storage logic to operate the hand device 3. Different operating modes can be selected via function switches 8.

The hand device 3 has a flat housing 4 of which is open at the underside and has a biaxial mechanism 17, as can be seen from the cutout portions of the housing. In the space between the shafts 18 of the mechanism, and parallel thereto, is an optical scanner 13 extending across the length of the housing 4. Assuming that the optical scanner 13 is designed to extend over the width of, e.g., an A4 size document, this would determine the length of the housing 4. At the top above it center off gravity, the housing 4 has a handle 5 on each end. Between the handles 5 and inclined towards the viewer, is a display device 9 consisting of, e.g., a liquid crystal display panel. Two movable margin stops 12 are located in the top part of the housing alongside the display device.

The mechanism 17 consists of two shafts 18 which are freely rotatable in the housing 4, to which shafts several rollers 19 are firmly attached. The latter have a slip-resistant coating on the running surface. The shafts 18 are coupled to each other (not visible). To one of the shafts 18 is fixed the rotatable part of a conventional shaft-angle encoder 20, e.g., as offered under the type designation "HEDS/5000/G11" by Hewlitt Packard GmbH, Herrnebergerster. 130, 7030 Boblingen, W. Germany. The rollers 19 and the shaft-angle encoder 20 are synchronized so that the shaft-angle encoder provides a signal at each incremental turn of the rollers 19 by one raster space when the hand device 3 sweeps the document 21 in the scan direction.

The optical scanner 13 consists of an illuminator 14 comprising two rows of closely adjacent LEDs, a one-dimensional optical system 15 consisting of rod lenses, as disclosed, e.g., in published German patent application DE-AS 19 42 601, and an optical-to-electric transducer 16 having a line-long raster-line sensor and an appropriate circuit. Such an optical scanner is described in data sheet TE-CIPS 216 MS1 1985-01-08 issued by Toshiba Corp., Japan, in connection with the Contact Image Sensor CIPS 200 A 01 C of the same manufacturer.

The handles 5 are shaped so that the hand device 3 can be lifted with both hands, put down on and aligned with the document to be scanned and moved back and forth in the scan direction.

Key switches 6 and 7 are fitted in the upper surfaces of the handles 5. These key switches serve to select the display and storage of the line area swwept by the hand device 3, as will be described in more detail hereinafter.

The display device 9 has a refresh memory WSp (FIG. 2) with scroll function, so that the line area scanned by the optical scanner 13 during movement of the hand device 3 may be simultaneously displayed on the display panel of the device 9. Preferably at the center, a horizontal line 10 is disposed on the display panel. The line shows the respective line area of the document 21 over which the rod-lens system 15 is present at the moment. The display device 9 reproduces the full scanning width in the horizontal direction, whereas in the vertical direction, in connection with the scroll effect, only a part of the lengthwise-swept document 21 is presented. The position of the margin stops 12 is marked on the display device 9 by vertical lines 11. The margin stops 12 determine the area which is to be evaluated, i.e. stored, of the total scanning width. It is thus possible to choose freely selectable parts from the total scanning width.

Figure 2:
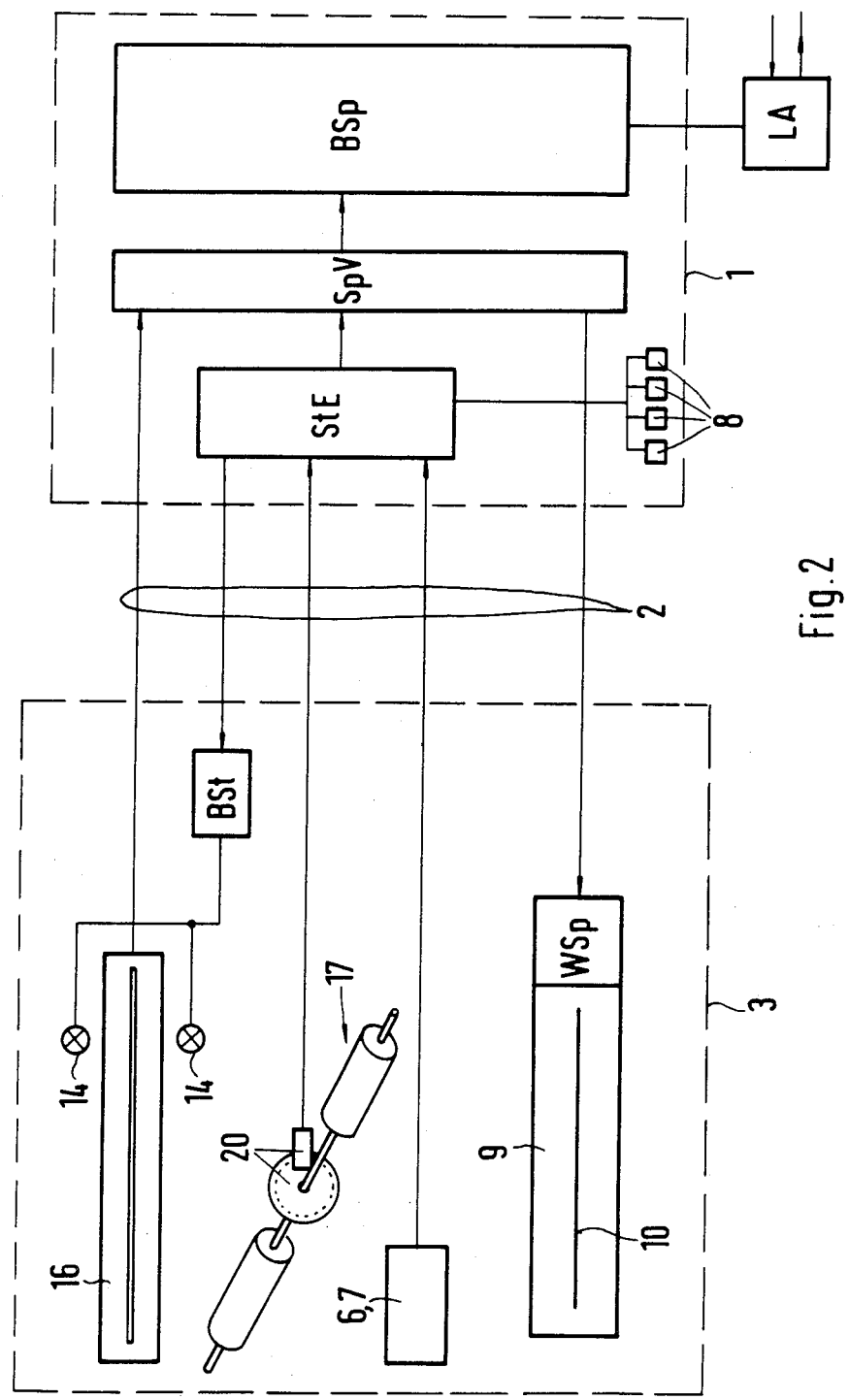
FIG. 2 is a schematic block diagram of the scanning device of FIG. 1.

FIG. 2 shows a schematic block diagram of the scanning device of FIG. 1. The control and storage logic of the control device 1 comprises a control unit StE, by which different operating modes can be selected via the function switches 8, a memory manager function SpV, and a picture-element memory BSp. The latter is connected to a transmission line via a line adapter LA, which is combined with e.g., a selection device and an error detection device, so as to permit external transmitting and receiving operation.

As is shown in FIG. 2, the optical-to-electric transducer 16 and the display device 9 of the hand device 3 are connected to the memory manager SpV of the control device 1, while the shaft-angle encoder 20 and the key switches 6 and 7 are connected to the control unit StE. the illuminator 14 of the optical scanner is controlled by an illumination controll BSt which in turn is connected to the control unit StE.

Referring to FIGS. 1 and 2, the operation of the scanning device described above, in particular that of the hand device 3, will now be described. The scanning device, which requires relatively little space, can be disposed laterally at the workplace. A slip-resistant support surface, which can be a work pad, may be used as a support for the documents to be scanned. After the control device 1 and the hand device 3 have been put in the operating mode via a corresponding function switch 8, the hand device 3 is placed on the document 21 which had previously been laid down on the scanning support. In this operating mode, the illuminator 14 of the optical scanner 13 is switched on, and the cells of the sensor array of the optical-to-electric transducer 16 are interrogated cyclically, at the repetition rate of the control unit StE, via the memory manager SpV. However, the raster lines scanned by the optical scanner are reproduced only when the key switch 6 in the left handle 5 is actuated. So long as the hand device 3 is not moved in the scan direction, only a more or less broken raster line is visible on the display panel 9 in accordance with the record on the document 21. In order to align the hand device 3 with, e.g., print lines on the document 21, the hand device has to be moved until at least one print line is completely visible on the display panel. In combination with the horizontal line 10 of the display panel, the hand device can then be set in relation to the text on the document.

By actuating the key switch 6, an operating mode is selected via the control unit StE which, with the interconnection of the memory manager SpV, represents a kind of short-circuit operation between the transducer 16 and the refresh memory WSp of the display device 9. As mentioned above, the scroll facility integrated in the memory WSp causes the print line area swept by the hand device 9 to be simultaneously displayed on the display panel of the hand device 9. The processing of the output signals of the transducer 16 is performed at the repetition rate of the signals delivered by the shaft-angle encoder 20 during movement of the hand device 3. As a result of the fixed coupling with the mechanism 17, the signals are provided as described above with the raster-line spacing. The generation of the signals is dependent on the speed of movement of the hand device 3, thus permitting operation by hand. Differing or varying speeds of movement cause the intervals between the signals to vary. Depending on the time sequence of the signals of the shaft-angle encoder 20, the intensity of the illumination of the document 21 by the illuminator 14 is controlled by the control unit StE via the illumination control BSt.

When the key switch 6 is pressed, the information to be stored and/or transmitted can first of all be viewed on the display device 9. This is of particular importance if the hand device 3 is to be aligned with a particular part of a larger document 21. The same applies to those cases in which, in order to reduce the width to be evaluated as compared to the scanning width, the margin stops 12 must be set prior to the final scanning operation.

The hand device 3 is designed to be aligned and moved with both hands by means of the handles 5. After the hand device 3 has been positioned, if the selected document information is to be stored, the key switch 7 has to be actuated in addition to the switch 6 while the hand device 3 sweeps the document 21. As a result, the control unit StE causes the memory management SpV to feed the interrogated sensor values in the raster line assignment determined by the shaft-angle encoder 20 not only into the refresh memory WSp of the display device 9, but also into the picture-element memory BSp.

By actuating a special function switch 8, the contents of the memory BSp can be made visible on the display panel of the device 9, e.g., for checking purposes. In that case, the optical scanner 13 is switched off. By moving the hand device 3 back and forth, the information contained in the picture-element memory BSp can be viewed in a scroll mode. In the same manner, externally received information that is stored in the picture-element memory BSp can be made visible on the display device 9 before being printed out by, e.g., a connected facsimile unit.

What is claimed is:

1. Optical scanner apparatus for raster line scanning of a document which has text on its upper side and which is supported on a flat surface, said apparatus comprising:
    a hand device comprising:
        a optical scanner comprising a linear array of optical to electric transducing elements,
        a position encoder for generating signals synchronized to the scanning of said document,
        a display panel for displaying data indicative of that line area of said document above which said optical scanner is located,
        two margin stops whose positions are indicated by respective displayed vertical lines on said display panel; and
    a control logic device for operating said hand device and for selectively storing only that portion of the scanned data presented on said display panel between said two vertical lines.

2. An apparatus as claimed in claim 1, wherein said hand device has handles to the right and to the left of said display device, said handles having key switches in their respective upper surfaces.

* * * * *